Nov. 12, 1935.　　　　　E. G. WARD　　　　　2,020,448

IMPLEMENT FOR CUTTING VEGETABLE GROWTHS

Filed Aug. 23, 1935

INVENTOR
E. G. Ward,
BY Chas. J. Williamson
ATTORNEY

Patented Nov. 12, 1935

2,020,448

UNITED STATES PATENT OFFICE 2,020,448

IMPLEMENT FOR CUTTING VEGETABLE GROWTHS

Ernest G. Ward, Nakina, N. C.

Application August 23, 1935, Serial No. 37,563

1 Claim. (Cl. 97—140)

My invention has to do with cutting down standing vegetable growths such as stalks of corn, cotton, tobacco, etc., and weeds, grass, etc. My object is to provide an implement that may be readily drawn over the ground, by horse or tractor, which will be sufficiently light in weight as to require the minimum of tractive power or draft, yet amply strong to resist the strains to which it is necessarily subjected in being pulled over the more or less rough, irregular surface of the ground; which will assure efficient action of the knives or blades; and which will, by simple means and easy manipulation, enable all necessary vertical and angular or inclined adjustment of the cutter blades needful for acceptable work.

My invention consists in whatever is described by or is included within the legal scope of the appended claim.

In the drawing I illustrate an implement that is a satisfactory embodiment of my invention, and in such drawing:—

Figure 1:
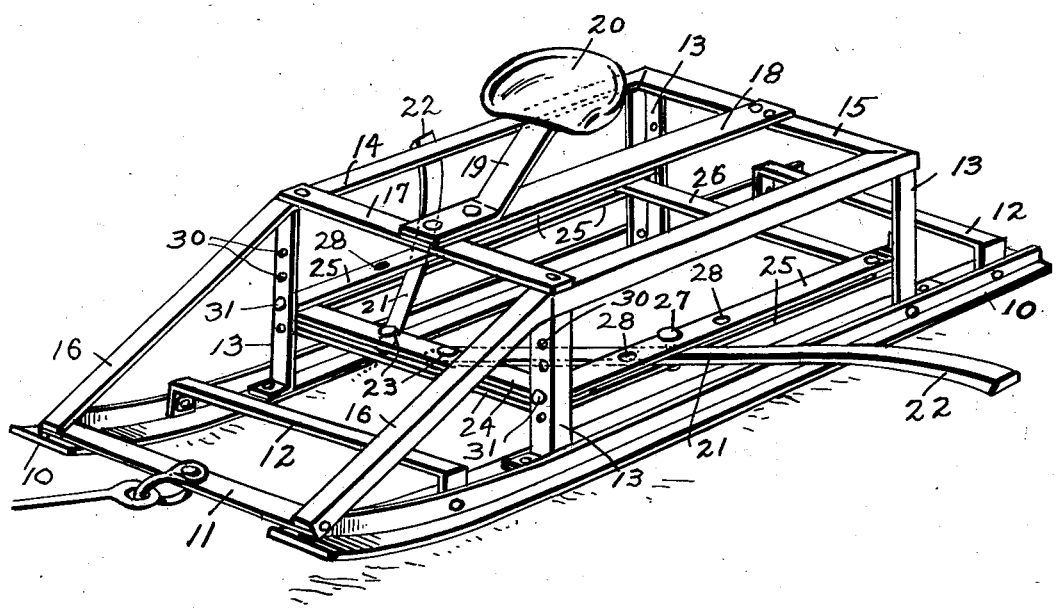
Fig. 1 is a perspective view of such implement.
Figure 2:
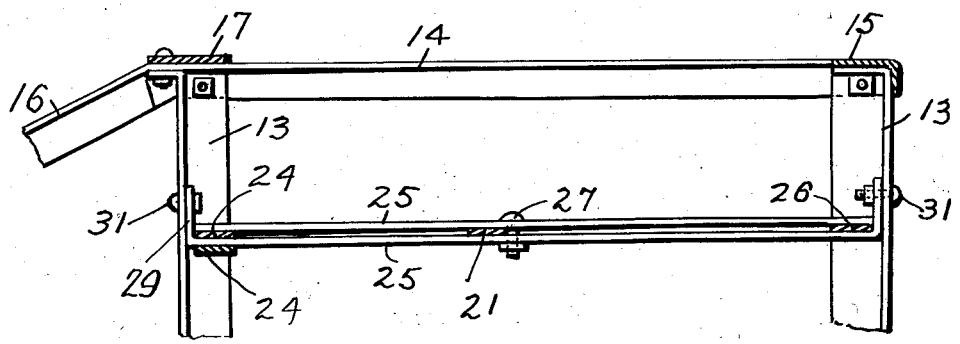
Fig. 2 is a detail view in vertical section at the frame corner posts, to show the vertically adjustable cutter support.

As clearly appears from Fig. 1, I make an openwork, cutter-supporting, frame wholly of metal, iron or steel bars of structural shapes, such as angles, which are bolted together by ordinary machine bolts, and which frame is mounted on two longitudinally extending, parallel, bottom bars 10 that form runners to slide over the ground, or to which may be applied cross rollers if rolling ground contact is desired. The bottoms of the runners are flat, and they curve upward at the front to clear or readily pass over ground surface irregularities.

The runners are rigidly joined and braced by two cross bars 11 at front and rear, and one 12 in rear of the front bar, which are bolted to the runners. Of course, additional cross bars may be used if desired.

Bolted at their bottom ends to the runners are four vertical posts 13, two for each runner, one being towards the front of the implement and the other towards the rear and each being an angle bar, one flange of which at the bottom is turned horizontally to rest on the top of the runner, and one flange at the top being turned horizontally to provide a bearing foot upon which rests, and to which is bolted, the horizontal flange of, an angle bar 14, placed directly above and extending parallel with the runner and constituting one side of a rectangular frame connected at the rear by a horizontal cross bar 15, and which at the front, forward of the front post, at each side, has a downward and forward extension 16 which is rigidly bolted to the front end of the runner. A single angle bar, by proper cuts and bending may provide the side and rear members of said rectangular frame. At the front, the side bars 14 are connected by a cross bar 17 bolted to the horizontal flanges of the angle bar. To the vertical flanges of the side bars 14 are bolted the upper ends of the flanges of the corner posts 13. The rear frame bar 15 and the front cross bar 17 are tied together and braced by a bar 18 bolted thereto at the transverse center of the frame, such bar thus extending longitudinally of the frame, and to the upper side thereof at the forward end is bolted a seat-supporting arm 19 which extends on an incline upward and rearward, and at its end carries a driver's seat 20. The weight of the driver is thus located forward of the implement.

It will be evident that the framework of my machine or implement may be inexpensively constructed of readily obtainable stock material, it is light yet adequately strong, and possesses all required rigidity to resist or withstand the hard usage to which such a machine or implement is bound to be subjected. And yet the frame structure has a certain amount of resiliency or elasticity which constitutes a safeguard against breakage which may result from rigid unyielding parts.

There are two knives or cutters, each in the form of a long bar, having a substantially straight shank 21 and a curved blade 22 whose forward edge is beveled to make it sharp, and these cutters generally extend from within the framework at an incline outward and rearward so as to expose their sharp or cutting edges beyond the adjacent side of the framework and in position to perform their cutting function as the implement is drawn or moved forward. The shank 21 at its forward end is secured by a vertical bolt 23 between a pair of upper and lower bars 24 which extend crosswise between the forward corner posts 13 and which at their ends adjacent the latter are secured to a pair of bars 25 spaced apart one above the other and extending to the rear corner posts 13 where they are rigidly connected together and braced by a horizontal cross bar 26. The cutter shanks extend from the bolts 23 each through the space between the bars 25 and are engaged above and below by these bars and are thereby firmly supported in a horizontal position. Each shank bolt 23 constitutes a pivot on which the cutter may be swung horizontally to change the angle at which it extends and each cutter may be supported rigidly at the angle desired as by means of the simple device of a vertical bolt 27 inserted in any selected one of a series of holes 28 in the pair of bars 25, the bolt, of course, being placed to engage the rear edge of the shank.

To enable vertical adjustment of the cutters so as to determine the height at which they will cut, the rectangular frame which is composed of the bars 24, 25, and 26 is vertically shiftable. Thus the lower bar of each pair 25 has at each end a vertical foot 29 which bears against the inwardly projecting vertical flange of the adjacent corner post 13 and the latter is provided with a vertical series of holes 30 through any selected one of which a bolt 31 may be passed which also passes through an aligning hole in the upturned foot 29 at the end of the lower bar 25. A suitable clevis or other means for hitching the draft animal or tractor is applied to the front cross bar 11.

While I provide the form and arrangement of parts shown and described because it gives a simple and inexpensive structure and one whose parts may be readily manipulated for purposes of adjustment, it is to be understood that I do not confine myself to such details because my invention may be embodied in other structures which will give the essential characteristics thereof.

Implements embodying my invention may be from four to seven feet long and of a suitable width and height. I mention this merely by way of illustration because I do not confine myself to any particular size.

What I claim is:—

An implement for cutting vegetable growth, comprising a ground engaging means upon which it may move thereover, including parallel longitudinally extending elements, vertical posts resting on such elements, an open-work main frame including longiutdinal and cross bars connected with said posts and spaced above such elements, cutters on both sides of the implement, and an open frame to which said cutters are attached and from which they extend horizontally outward with cutting parts situated beyond the outer sides of said main frame, said cutters having shanks attached to said open frame at their forward ends, and the open frame including spaced bars between which the shanks extend.

ERNEST G. WARD.